United States Patent
Goetzke et al.

(10) Patent No.: US 9,255,552 B2
(45) Date of Patent: Feb. 9, 2016

(54) ENGINE SYSTEM HAVING DEDICATED DONOR CYLINDERS FOR EGR

(71) Applicant: Electro-Motive Diesel, Inc., LaGrange, IL (US)

(72) Inventors: Michael B. Goetzke, Orland Park, IL (US); Reddy Pocha Siva Sankara, Lisle, IL (US); Stephen M. Bednarz, De Kalb, IL (US); Deep Bandyopadhyay, Naperville, IL (US); Steven Dallas Johnson, Naperville, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 322 days.

(21) Appl. No.: 13/889,741

(22) Filed: May 8, 2013

(65) Prior Publication Data

US 2014/0331978 A1    Nov. 13, 2014

(51) Int. Cl.
*F02M 25/07* (2006.01)
*F01N 13/10* (2010.01)

(52) U.S. Cl.
CPC ......... *F02M 25/0749* (2013.01); *F01N 13/107* (2013.01); *F02M 25/0732* (2013.01); *F02M 25/0707* (2013.01); *Y02T 10/121* (2013.01)

(58) Field of Classification Search
CPC ..... F02D 21/08; F02D 41/0007; F02B 33/44; F02M 25/07; F02M 25/0749
USPC ........... 123/568.11, 568.12, 568.18, 672, 676
See application file for complete search history.

(56) References Cited

U.S. PATENT DOCUMENTS

| 5,517,976 A | 5/1996 | Bächle et al. |
| 5,671,600 A | 9/1997 | Pischinger et al. |

(Continued)

FOREIGN PATENT DOCUMENTS

| DE | 197 17 846 | 11/1998 |
| EP | 1072765 | 6/2010 |

(Continued)

OTHER PUBLICATIONS

Dr. Johannes Kech et. al, "Exhaust Gas Recirculation: Internal Engine Technology for Reducing Nitrogen Oxide Emissions", Engine Technology, MTU Friedrichshafen GmbH, www.mtu-online.com (Aug. 2011).

(Continued)

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

An engine system for a machine is disclosed. The engine system may have a first intake manifold configured to distribute air into a first cylinder bank of an engine. The engine system may also have a second intake manifold configured to distribute air into a second cylinder bank of the engine. The engine system may have a first exhaust manifold configured to discharge exhaust from the first cylinder bank to the atmosphere. The engine system may further have a second exhaust manifold configured to discharge exhaust from non-donor cylinders in the second cylinder bank to the atmosphere. In addition, the engine system may have a third exhaust manifold separate from the first and second exhaust manifolds and configured to recirculate exhaust from donor cylinders in the second cylinder bank to the first and second intake manifolds.

20 Claims, 6 Drawing Sheets

(56) References Cited

U.S. PATENT DOCUMENTS

| | | | |
|---|---|---|---|
| 6,082,100 | A | 7/2000 | Boegner et al. |
| 6,945,235 | B1 | 9/2005 | Bertilsson et al. |
| 7,941,999 | B2 | 5/2011 | Kasper et al. |
| 2002/0069862 | A1* | 6/2002 | Faletti .................. 123/568.17 |
| 2004/0194463 | A1 | 10/2004 | Yanagisawa et al. |
| 2005/0274366 | A1* | 12/2005 | Sato .......................... 123/568.2 |
| 2006/0174621 | A1* | 8/2006 | Chen et al. ...................... 60/612 |
| 2007/0039314 | A1 | 2/2007 | Mizuguchi |
| 2008/0060624 | A1 | 3/2008 | Grandas |
| 2008/0216475 | A1* | 9/2008 | Kasper et al. ................ 60/605.2 |
| 2011/0253113 | A1 | 10/2011 | Roth et al. |
| 2012/0078492 | A1 | 3/2012 | Freund et al. |
| 2012/0222659 | A1* | 9/2012 | Kulkarni et al. ......... 123/568.11 |
| 2012/0317978 | A1* | 12/2012 | Streutker et al. ............. 60/605.2 |
| 2012/0325187 | A1* | 12/2012 | Sankar et al. ............ 123/568.21 |

FOREIGN PATENT DOCUMENTS

| | | |
|---|---|---|
| GB | 2 093 909 | 9/1982 |
| JP | 2007/23920 | 7/2005 |
| WO | WO 2010/116064 | 10/2010 |
| WO | WO 2012/069376 | 5/2012 |

OTHER PUBLICATIONS

U.S. Patent Application of Keith A. Moravec et al., entitled "Engine System With Passive Regeneration of a Filter in EGR Loop" filed on Jan. 31, 2013.

U.S. Patent Application of Steven Dallas Johnson, entitled "Exhaust System Having Parallel EGR Coolers" filed on Jan. 31, 2013.

U.S. Patent Application of Keith A. Moravec et al., entitled "Engine System for Increasing Available Turbocharger Energy" filed on Mar. 14, 2013.

* cited by examiner

ENGINE SYSTEM HAVING DEDICATED DONOR CYLINDERS FOR EGR

TECHNICAL FIELD

The present disclosure relates generally to an engine system and, more particularly, to an engine system having dedicated donor cylinders for exhaust gas recirculation (EGR).

BACKGROUND

Internal combustion engines such as diesel engines burn a mixture of air and fuel within the engine, generating mechanical power and a consequent flow of exhaust. Engine exhaust contains air pollutants, including unburned fuel, particulate matter such as soot, and harmful gases such as nitrous oxide or carbon monoxide. A modern engine must meet stringent emissions standards, which limit the amount and type of pollutants that the engine may discharge into the atmosphere.

Modern engines often use EGR systems to help reduce pollutants in the engine exhaust. An EGR system recirculates engine exhaust through the combustion chambers of an engine by mixing some of the exhaust with fresh air entering the combustion chambers. The exhaust-air mixture lowers the combustion temperature and helps to reduce the amount of undesirable pollutants produced during operation of the engine.

An exemplary EGR system is disclosed in U.S. Pat. No. 7,941,999 of Kasper et al. that issued on May 17, 2011 ("the '999 patent"). The '999 patent discloses an engine with a first cylinder bank and a second cylinder bank. Exhaust gases from a first cylinder group in the first cylinder bank are collected in a first section and supplied to a turbocharger. Exhaust gases from a second cylinder group in the first cylinder bank are collected in a second section and supplied to the charge air supply lines connected to the first and second cylinder banks. Exhaust gases from the second cylinder bank are supplied to a different turbocharger before being discharged to the atmosphere. The exemplary EGR system of the '999 patent also includes three control devices for setting the EGR rate. A first control device is located between the first and second sections. A second control device is located between the second section and the turbocharger. A third control device is located downstream from a cooler, which cools exhaust from the second section before supplying the exhaust to the charge air supply lines.

Although the system of the '999 patent may help lower engine emissions by re-circulating the exhaust through all cylinders of the engine, the system may still be less than optimal. Specifically, the number of control devices used by the system of the '999 patent may increase the cost and complexity of the engine. Additionally, the first and second control devices can be subjected to an extreme environment, leading to excessive wear and premature failure of these devices.

The engine system of the present disclosure solves one or more of the problems set forth above and/or other problems in the art.

SUMMARY

In one aspect, the present disclosure is directed to an engine system. The engine system may include a first intake manifold configured to distribute air into a first cylinder bank of an engine. The engine system may also include a second intake manifold configured to distribute air into a second cylinder bank of the engine. The engine system may include a first exhaust manifold configured to discharge exhaust from the first cylinder bank to the atmosphere. The engine system may further include a second exhaust manifold configured to discharge exhaust from non-donor cylinders in the second cylinder bank to the atmosphere. In addition, the engine system may include a third exhaust manifold separate from the first and second exhaust manifolds and configured to recirculate exhaust from donor cylinders in the second cylinder bank to the first and second intake manifolds.

In another aspect, the present disclosure is directed to a method of operating an engine. The method may include distributing air through a first intake manifold into a first cylinder bank of the engine. The method may also include distributing air through a second intake manifold into a second cylinder bank of the engine. The method may include discharging exhaust from the first cylinder bank through a first exhaust manifold to the atmosphere. The method may further discharging exhaust from non-donor cylinders in the second cylinder bank through a second exhaust manifold to the atmosphere. In addition, the method may include recirculating exhaust from donor cylinders in the second cylinder bank through a third exhaust manifold to the first and second intake manifolds. The third exhaust manifold may be separate from the first and second exhaust manifolds.

DETAILED DESCRIPTION

Figure 1:
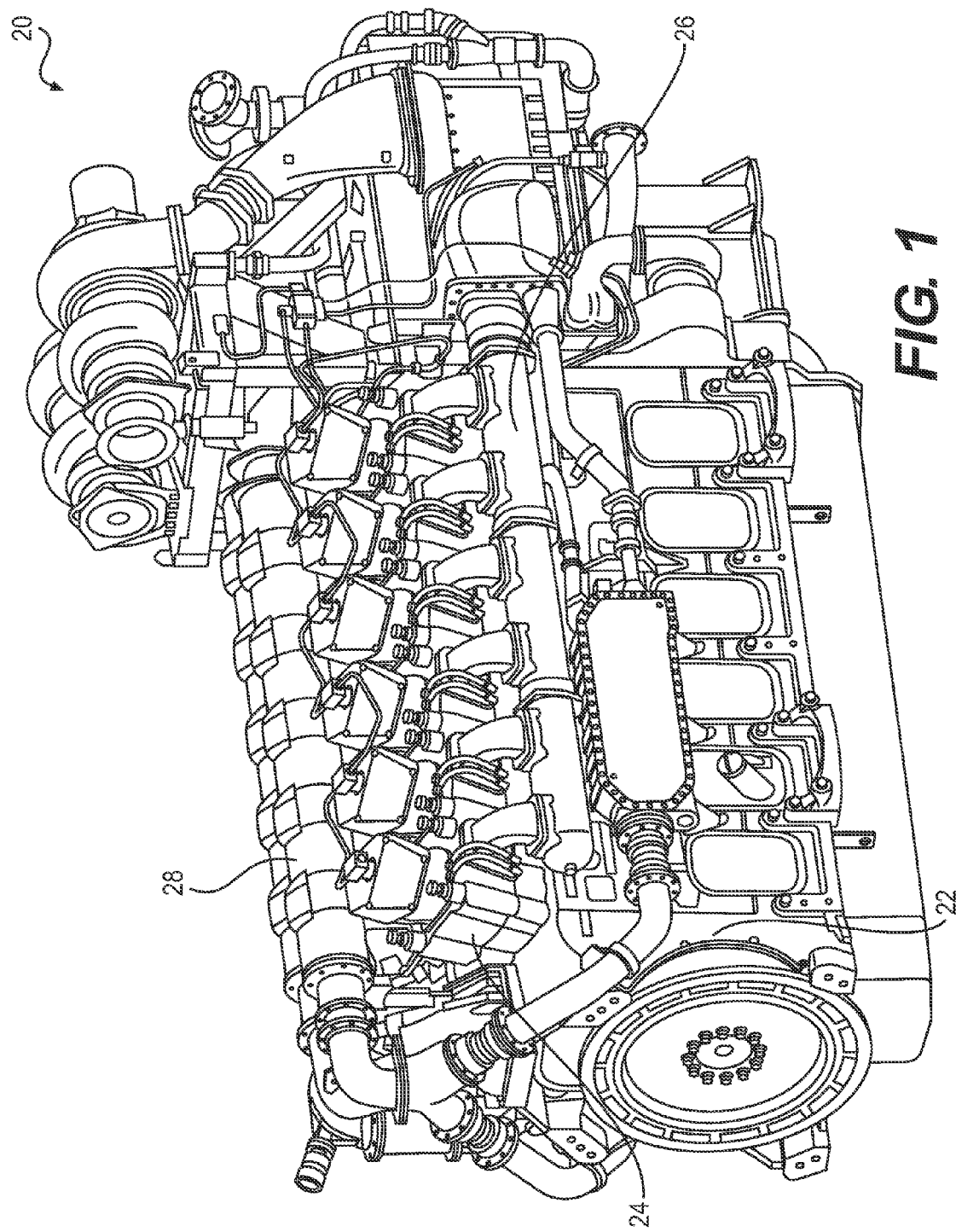
FIG. 1 is an isometric illustration of an exemplary disclosed engine.

FIG. 1 illustrates an exemplary internal combustion engine 20. Engine 20 may be a two-stroke diesel engine. It is contemplated that engine 20 may be another type of engine, for example, a four-stroke diesel engine, a two-stroke or four-stroke gasoline engine, or a two-stroke or four-stroke gaseous-fuel-powered engine. Engine 20 may include, among other things, an engine block 22 that includes combustion chambers 24. In the illustrated embodiment, engine 20 includes twelve combustion chambers 24 arranged in a V-configuration. It is contemplated however that engine 20 may include any number of combustion chambers 24, which may be disposed in an in-line configuration, in an opposing-piston configuration, or in any other suitable configuration. Engine 20 may also include an air intake system 26 and an exhaust system 28.

Figure 2:
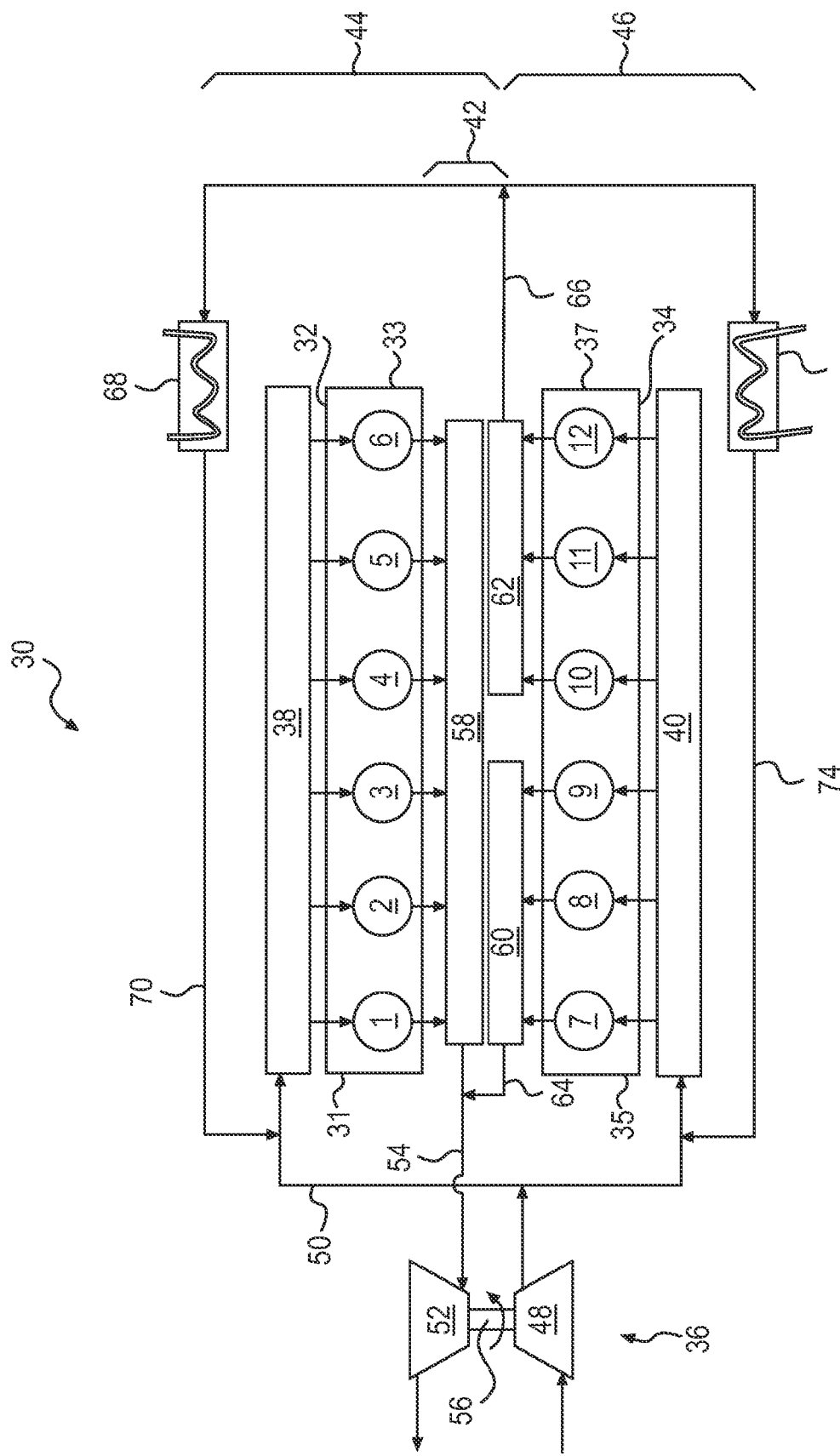
FIG. 2 is a diagrammatic illustration of an exemplary disclosed system that may be used in conjunction with the engine of FIG. 1.

FIG. 2 illustrates an engine system 30, which may be used in conjunction with engine 20. As shown in FIG. 2, engine system 30 may include a first cylinder bank 32 and a second cylinder bank 34. Although FIG. 2 depicts only two cylinder banks (e.g. 32, 34), it is contemplated that engine system 30 may include any number cylinder banks. In one exemplary embodiment, first cylinder bank 32 and second cylinder bank 34 may be disposed at an angle with respect to each other. In another exemplary embodiment the angle may be about 45°.

First cylinder bank 32 may include cylinders 1, 2, 3, 4, 5, and 6. Cylinder 1 may be located near a first end 31 of first cylinder bank 32. Cylinder 6 may be located near a second end 33 of first cylinder bank 32. Cylinders 2-5 may be disposed in between cylinder 1 and cylinder 6. Second cylinder bank 34 may include cylinders 7, 8, 9, 10, 11, and 12. Cylinder 7 may be located near a first end 35 of second cylinder bank 34. Cylinder 12 may be located near a second end 37 of second cylinder bank 34. Cylinders 8-11 may be disposed in between cylinder 7 and cylinder 12. Although, FIG. 2 depicts first and second cylinder banks 32, 34 as having 6 cylinders, it is contemplated that first and second cylinder banks 32, 34 each may have more or less than 6 cylinders. Some or all of cylinders 1-12 may be donor cylinders or non-donor cylinders. As used in this disclosure, a donor cylinder is an engine cylinder, which donates some or all of the exhaust generated by that cylinder for recirculation through any of the cylinders in the engine. In contrast, as used in this disclosure, a non-donor cylinder is an engine cylinder from which all the exhaust is discharged to the atmosphere, and which does not donate any exhaust for recirculation through any of the cylinders in the engine. In the disclosed embodiment, cylinders 10, 11, and 12 are donor cylinders. In contrast, cylinders 1-9 are non-donor cylinders. Although the disclosed embodiment in FIG. 2 shows only three donor cylinders, it is contemplated that second cylinder bank 34 may contain any number of donor cylinders. It is also contemplated that first and second cylinder banks 32, 34 may each contain only non-donor cylinders, only donor cylinders, or a combination of both non-donor cylinders and donor cylinders.

Engine system 30 may include components configured to introduce air into and discharge exhaust from cylinders 1-12. For example, engine system 30 may include turbocharger 36, first intake manifold 38, second intake manifold 40, exhaust arrangement 42, first EGR circuit 44, and second EGR circuit 46.

Turbocharger 36 may include compressor 48, which may compress air and direct the compressed air via passageway 50 to first intake manifold 38 and second intake manifold 40. Compressor 48 may be driven by turbine 52, which may be propelled by exhaust flowing out from exhaust arrangement 42 via passageway 54. Exhaust may be discharged from turbine 52 to the atmosphere. Any number and type of aftertreatment components (not shown) known in the art may be located upstream or downstream of turbine 52 to further remove harmful pollutants from the exhaust before discharging the exhaust into the atmosphere. Compressor 48 may embody a fixed geometry compressor, a variable geometry compressor, or any other type of compressor configured to draw air from the atmosphere and compress the air to a predetermined pressure level. Turbine 52 may be directly and mechanically connected to compressor 48 by way of a shaft 56 to form turbocharger 36. As hot exhaust gases exiting exhaust arrangement 42 via passageway 54 move through and expand in turbine 52, turbine 52 may rotate and drive compressor 48 to pressurize and direct air to first and second intake manifolds 38, 40. Although only one turbocharger 36 is depicted in FIG. 2, it is contemplated that engine system 30 may include any number of turbochargers 36. Moreover, each turbocharger 36 may include any number of compressors 48 and turbines 52.

First intake manifold 38 may receive compressed air from compressor 48 via passageway 50. First intake manifold 38 may distribute the compressed air into cylinders 1-6 in first cylinder bank 32. Similarly, second intake manifold 40 may receive compressed air from compressor 48 via passageway 50. Second intake manifold 40 may distribute the compressed air into cylinders 7-12 in second cylinder bank 34. Although FIG. 2 depicts two intake manifolds (e.g. 38, 40), it is contemplated that engine system 30 may include any number of intake manifolds.

Exhaust arrangement 42 may include first exhaust manifold 58, second exhaust manifold 60, and third exhaust manifold 62. First exhaust manifold 58 may receive exhaust generated by non-donor cylinders 1-6 in first cylinder bank 32. Exhaust from first exhaust manifold 58 may be directed to turbocharger 36 via passageway 54 before being discharged into the atmosphere. Second exhaust manifold 60 may receive exhaust generated by non-donor cylinders 7-9 in second cylinder bank 34. Exhaust from second exhaust manifold 60 may be directed to turbocharger 36 via passageway 64 before being discharged into the atmosphere. Passageway 64 may merge with passageway 54 so that second exhaust manifold 60 may be fluidly connected with first exhaust manifold 58. It is contemplated, however, that passageways 54, 64 may separately deliver exhaust from first exhaust manifold 58 and second exhaust manifold 60, respectively, to turbocharger 36. Third exhaust manifold 62 may receive exhaust from donor cylinders 10-12 and recirculate the exhaust via passageway 66 to first and second EGR circuits 44, 46, respectively. Third exhaust manifold 62 may be separate from first exhaust manifold 58 and second exhaust manifold 60. As used in this disclosure, separate means completely disconnected or isolated. Thus, there may be no passageway connecting first exhaust manifold 58 and/or second exhaust manifold 60 with third exhaust manifold 62.

Although two separate exhaust manifolds (e.g. 58, 60) associated with non-donor cylinders 1-9 have been described above, it is contemplated that first and second exhaust manifolds 58, 60 may be replaced by a single exhaust manifold which receives exhaust from all non-donor cylinders 1-9. It is also contemplated that in some exemplary embodiments, there may be less than or more than two exhaust manifolds associated with non-donor cylinders 1-9 and with donor cylinders 10-12. Additionally, although FIG. 2 depicts cylinders 7-9 as donor cylinders, any other combination of cylinders, for example, cylinders 1-3, 4-6, or 7-9 may be selected as donor cylinders in particular embodiments.

It may be preferable to select adjacent cylinders as donor cylinders to help ensure compact packaging of first, second, and third exhaust manifolds 58, 60, 62 and other components of engine system 30 in engine 20. Selecting non-adjacent cylinders as donor cylinders may require design of more complicated passageways to collect the exhaust from the non-adjacent donor cylinders, which may lead to an increase in a size of engine 20.

Selecting adjacent cylinders as donor cylinders may also be preferable to help reduce variability in an amount of exhaust available for EGR. When the time interval between combustion events in donor cylinders 10-12 is non-uniform, an amount of exhaust that may be available for EGR in third exhaust manifold 62 may also vary over time during operation of engine system 30. Such variations in the amount of exhaust available for EGR may undesirably increase pollutants generated by cylinders 1-12. To minimize the amount of pollutants generated by cylinders 1-12, it may be preferable for donor cylinders 10-12 to have combustion events occur at uniform intervals, which may help ensure that a more uniform amount of exhaust for EGR may be available during operation of engine system 30.

In one exemplary embodiment, in which combustion events in cylinders 1-12 may occur sequentially in cylinders 1-7-5-11-3-9-6-12-2-8-4-10, respectively, a uniform amount of exhaust for EGR may be obtained by selecting as donor cylinders any 3 cylinders located adjacent to each other with at least one of the three donor cylinders being located adjacent the first end or the second end of the first or second cylinder banks 32, 34, respectively. For example, cylinders 1-3, 4-6, 7-9, or 10-12 may be selected as donor cylinders, so that a combustion event may occur in a donor cylinder (e.g. 10, 11, or 12) after three successive combustion events in a non-donor cylinder (e.g. 1, 2, 3, 4, 5, 6, 7, 8, or 9). The interval between combustion events may be measured in terms of a crank angle, which is an amount of angular rotation of the crankshaft. In the disclosed exemplary embodiment, when combustion events occur sequentially in cylinders 1-7-5-11-3-9-6-12-2-8-4-10, selecting cylinders 1-3, 4-6, 7-9, or 10-12 as donor cylinders may result in a uniform interval of about 240° crank angle between combustion events in donor cylinders 10-12.

First EGR circuit 44 may include first EGR cooler 68. First EGR cooler 68 may cool a first amount of exhaust flowing through passageway 70. The first amount of exhaust may mix with fresh air supplied by compressor 48 in first intake manifold 38. First intake manifold 38 may distribute the air-exhaust mixture to non-donor cylinders 1-6.

Second EGR circuit 46 may include second EGR cooler 72. Like first EGR cooler 68, second EGR cooler 72 may cool a second amount of exhaust flowing through passageway 74. The second amount of exhaust may mix with fresh air supplied by compressor 48 in second intake manifold 40. Second intake manifold 40 may distribute the air-exhaust mixture to non-donor cylinders 7-9 and donor cylinders 10-12. First and second EGR coolers 68, 72 may include an air-to-liquid heat exchanger, an air-to-air heat exchanger, or any other type of heat exchanger known in the art for cooling an exhaust flow.

As illustrated in FIG. 2, all the exhaust generated by donor cylinders 10-12 may be recirculated via first and second EGR circuits 44, 46 into cylinders 1-9. In the disclosed embodiment, exhaust from three donor cylinders 10-12 is recirculated into twelve cylinders 1-12 providing an EGR rate of about 25%. As used in this disclosure, EGR rate refers to a ratio of a number of cylinders selected as donor cylinders and the total number of cylinders in engine system 30. The EGR rate may be expressed as a fraction, a decimal number, or as a percentage. More or less number of cylinders may be selected as donor cylinders to provide more of less of the EGR rate in engine system 30.

It is contemplated that any of cylinders 1-12 could be selected as a donor cylinder or non-donor cylinder. It is also contemplated that more than or less than 3 cylinders in one or both of first and second cylinder banks 32, 34 may be designated as donor cylinders or non-donor cylinders. For example, selecting any four cylinders out of cylinders 1-12 as donor cylinders may provide an EGR rate of about 33%. Similarly, selecting any six cylinders out of cylinders 1-12 as donor cylinders may provide an EGR rate of about 50%.

As depicted in FIG. 2, engine system 30 does not include any flow control components to control the amount of exhaust flowing from third exhaust manifold 62 to first and second intake manifolds 38, 40, respectively. Excluding flow control components from engine system 30 may help to decrease the cost of implementing and maintaining engine system 30.

Figure 3:
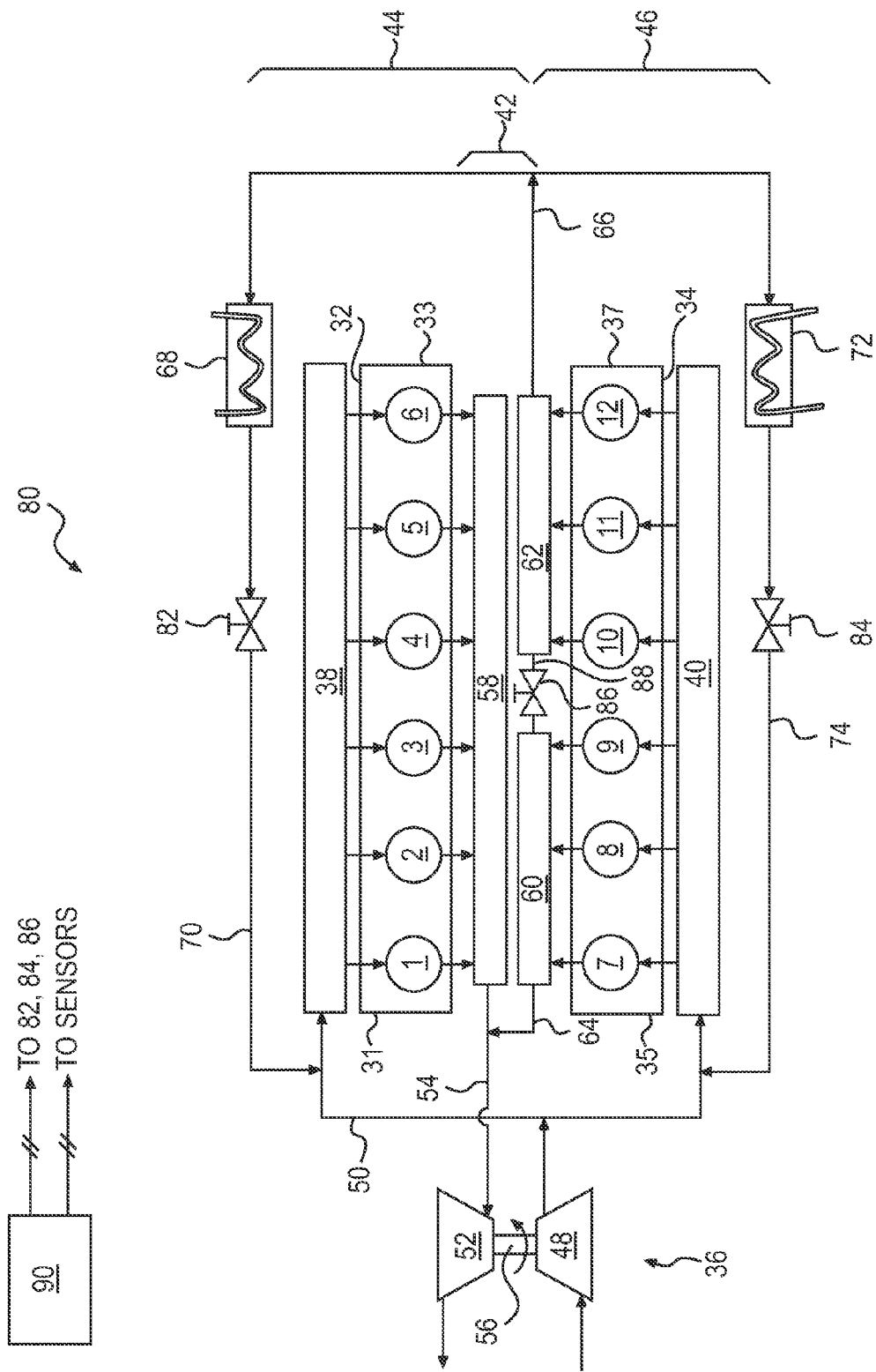
FIG. 3 is a diagrammatic illustration of another exemplary disclosed system that may be used in conjunction with the engine of FIG. 1.

FIG. 3 illustrates an engine system 80, which may be used in conjunction with engine 20. Many of the components of engine system 80 are similar to those already described with reference to engine system 30. In the following disclosure, only those components, which may be different from the components of engine system 30, are described.

As illustrated in FIG. 3, engine system 80 may include first control valve 82, second control valve 84, and third control valve 86. First control valve 82 may be disposed in passageway 70 in first EGR circuit 44 to control exhaust flowing from third exhaust manifold 62 to first intake manifold 38. First control valve 82 may be located downstream from first EGR cooler 68 and may be configured to selectively direct a first amount of exhaust from third exhaust manifold 62 to first intake manifold 38. Like first control valve 82, second control valve 84 may be disposed in passageway 74 in second EGR circuit 46. Second control valve 84 may control exhaust flowing from third exhaust manifold 62 to second intake manifold 40. Second control valve 84 may be disposed downstream of second EGR cooler 72 and may be configured to selectively direct a second amount of exhaust from third exhaust manifold 62 to second intake manifold 40. Although FIG. 3 depicts only one first control valve 82 and one second control valve 84, it is contemplated that first EGR circuit 44 may include more than one first control valve 82 and second EGR circuit 46 may include more than one second control valve 84. Placing first and second control valves 82, 84 downstream from first and second EGR coolers 68, 72, respectively, may advantageously expose first and second control valves 82, 84 to relatively cooler exhaust, which may help prevent wear and increase the useful life of first and second control valves 82, 84. It is contemplated, however, that in some exemplary embodiments, first and second control valves 82, 84 may be disposed upstream of first and second EGR coolers 68, 72, respectively. Engine system 80 may include a passageway 88 connecting second exhaust manifold 60 and third exhaust manifold 62. Third control valve 86 may be disposed in passageway 88 to control an amount of exhaust that may flow from third exhaust manifold 62 to second exhaust manifold 60.

First control valve 82 may be a two-position or proportional type valve having a valve element movable to regulate a flow of exhaust through passageway 70. The valve element in first control valve 82 may be hydraulic or pneumatic and may be operable to move between a flow-passing position and a flow-blocking position. In the flow-passing position, first control valve 82 may permit exhaust to flow through passageway 70 substantially unrestricted by first control valve 82. In contrast, in the flow-blocking position, first control valve 82 may completely block exhaust from flowing through passageway 70. Second and third control valves 84, 86 may regulate a flow of exhaust through passageways 74, 88, respectively, and may have a structure and method of operation similar to that of first control valve 82.

Engine system 80 may also include controller 90, which may be configured to control the operation of engine system 80. Before, during, and/or after regulating exhaust flow through first and second EGR circuits 44, 46 via first, second, and third control valves 82, 84, 86, controller 90 may receive data indicative of an operational condition of engine 20 and/or an actual flow rate, temperature, pressure, and/or constituency of exhaust within first, second, and third exhaust manifolds 58, 60, 62 and/or first and second EGR circuits 44, 46. Such data may be received from another controller or computer (not shown), from sensors strategically located throughout engine system 80, and/or from a user of engine 20. Controller 90 may then utilize stored algorithms, equations, subroutines, look-up maps and/or tables to analyze the operational condition data and determine a corresponding desired flow rate and/or constituency of exhaust within passageways 54, 64 that sufficiently reduces the amount of pollutants discharged to the atmosphere. Based on the desired flow rate and/or constituency, controller 90 may then cause first, second, and third control valves 82, 84, 86 to be adjusted such that the desired first and second amounts of exhaust may be supplied by first and second EGR circuits 44, 46, into first and second intake manifolds 38, 40, respectively. It is contemplated that the first amount of exhaust that may pass through first EGR circuit 44 may be greater than, less than, or about equal to the second amount of exhaust, which may pass through second EGR circuit 46.

Controller 90 may embody a single microprocessor, multiple microprocessors, digital signal processors (DSPs), etc. that include means for controlling an operation of engine system 80 and engine 20. Numerous commercially available microprocessors can be configured to perform the functions of controller 90. It should be appreciated that controller 90 could readily embody a microprocessor separate from that controlling other machine-related functions, or that controller 90 could be integral with a machine microprocessor and be capable of controlling numerous machine functions and modes of operation. If separate from the general machine microprocessor, controller 90 may communicate with the general machine microprocessor via data links or other methods. Various other known circuits may be associated with controller 90, including power supply circuitry, signal-conditioning circuitry, actuator driver circuitry (i.e., circuitry powering solenoids, motors, or piezo actuators), and communication circuitry.

Figure 4:
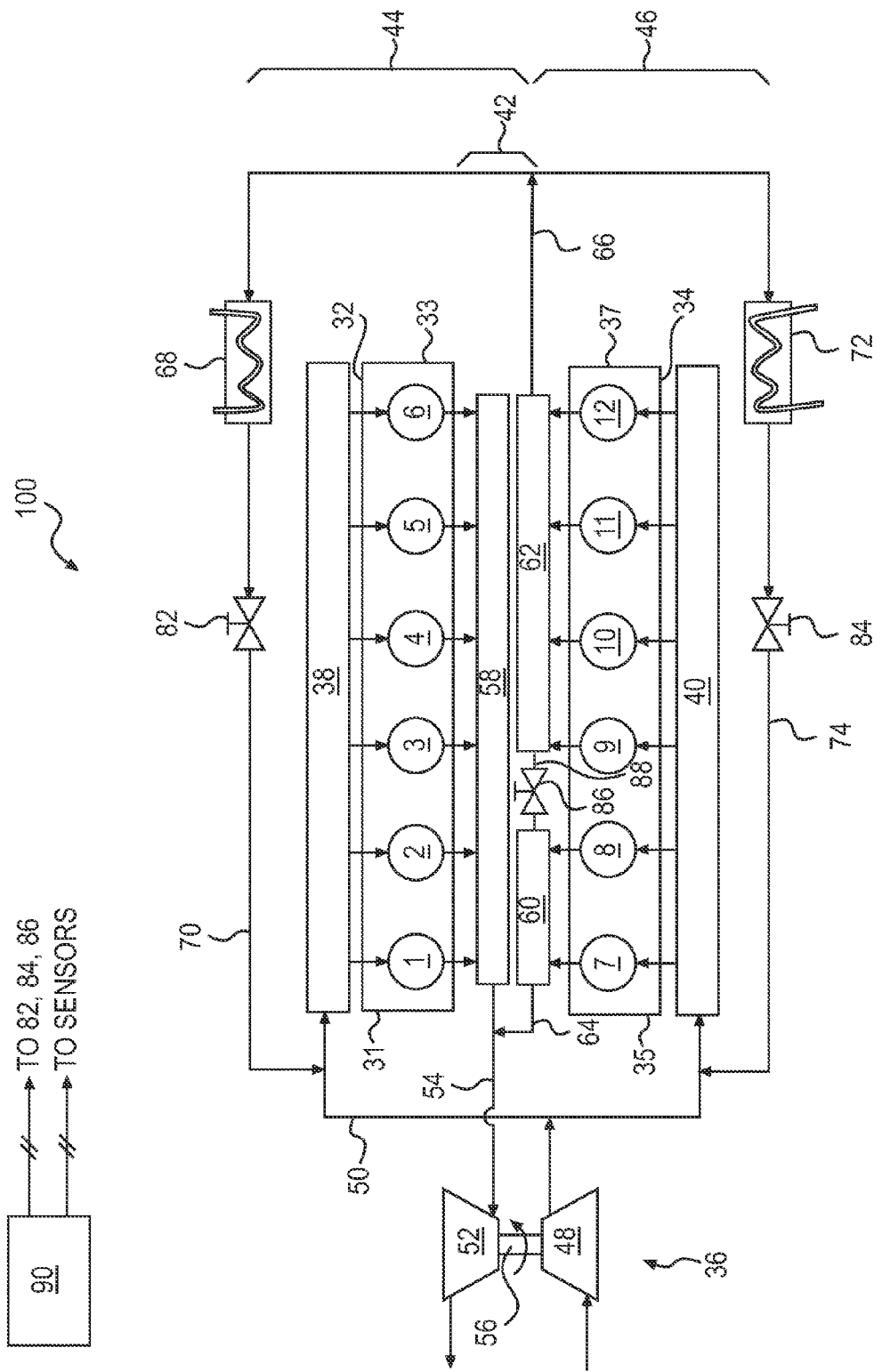
FIG. 4 is a diagrammatic illustration of another exemplary disclosed system that may be used in conjunction with the engine of FIG. 1.

FIG. 4 illustrates an engine system 100, which may be used in conjunction with engine 20. Many of the components of engine system 100 are similar to those already described with reference to engine system 30 and engine system 80. In the following disclosure, only those components, which may be different from the components of engine systems 30 or 80, are described.

As illustrated in FIG. 4, in engine system 100, four cylinders 9-12 may be donor cylinders and eight cylinders 1-8 may be non-donor cylinders. Thus, engine system 100 may provide an EGR rate of about 33%. Although FIG. 4 depicts cylinders 9-12 as donor cylinders, cylinders 1-4 or 3-6 or 7-10 may be selected as donor cylinders in other exemplary embodiments. As discussed in the context of engine systems 30 and 80, selecting four adjacent cylinders 1-4, 3-6, 7-10, or 9-12 as donor cylinders may simplify the design of first, second, and third exhaust manifolds 58, 60, 62, which may allow for compact packaging of the components of engine system 100.

Unlike engine systems 30, 80, however, selecting four adjacent cylinders as donor cylinders may still result in a non-uniform flow of exhaust from third exhaust manifold 62 to first and second intake manifolds 38, 40. For example, in a 12 cylinder engine in which combustion events in cylinders 1-12 occur sequentially in cylinders 1-7-5-11-3-9-6-12-2-8-4-10, respectively, selecting cylinders 1-4, 3-6, 7-10, or 9-12 on first or second cylinder bank 32, 34 as donor cylinders may produce combustion event intervals of 120°, 120°, 240°, and 240° crank angle between the donor cylinders. Although the intervals between combustion events in the donor cylinders may be unequal, this arrangement of donor cylinders may still help ensure a minimum amount of pollutants are produced by cylinders 1-12.

Figure 5:
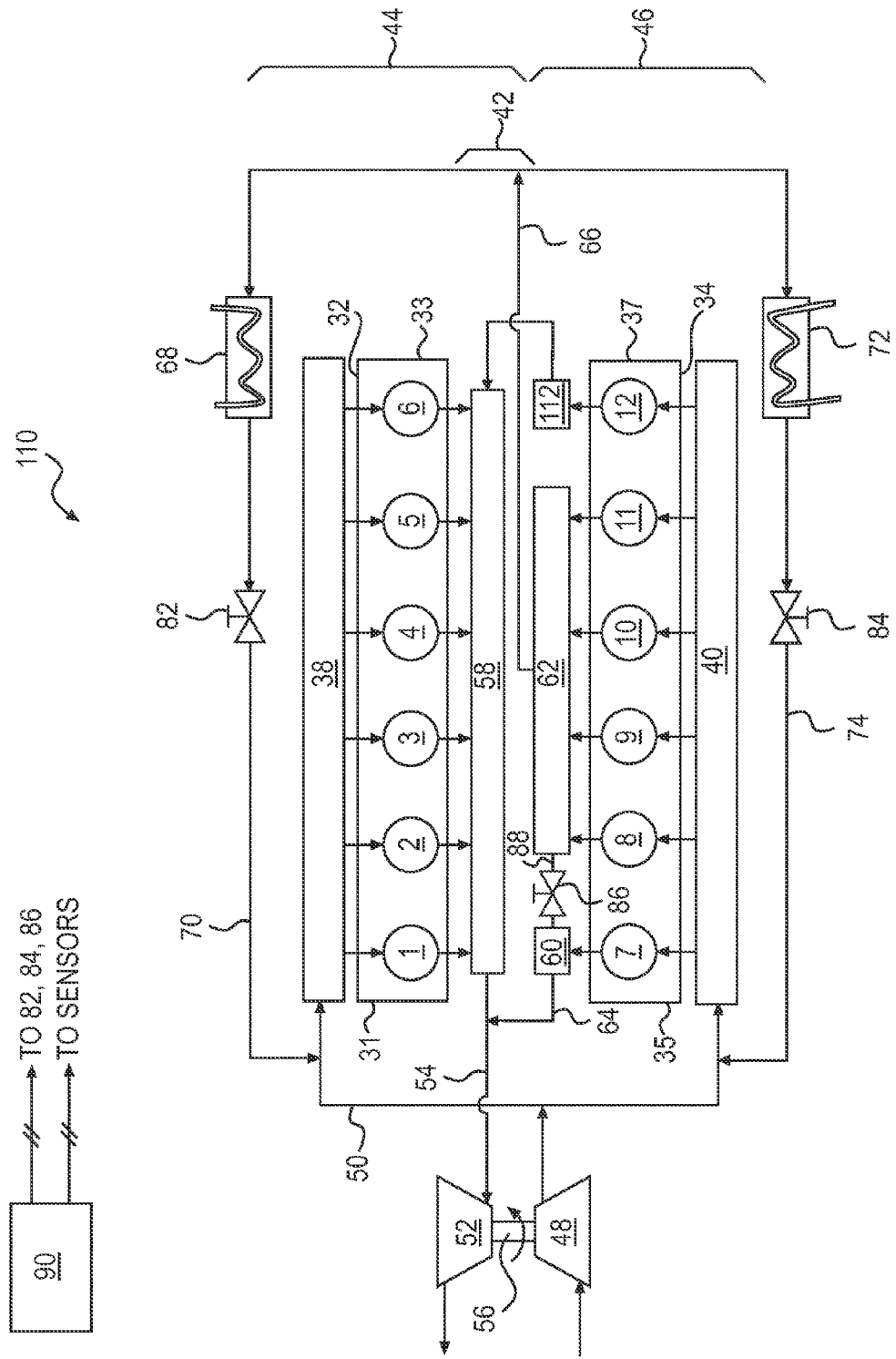
FIG. 5 is a diagrammatic illustration of another exemplary disclosed system that may be used in conjunction with the engine of FIG. 1.

FIG. 5 illustrates an engine system 110, which may be used in conjunction with engine 20. Many of the components of engine system 110 are similar to those already described with reference to engine systems 30, 80, and 100. In the following disclosure, only those components, which may be different from the components of engine systems 30, 80, and 100 are described.

As illustrated in FIG. 5, in engine system 110, four cylinders 8-11 may be donor cylinders and eight cylinders 1-6, 7, and 12 may be non-donor cylinders. In the disclosed embodiment in FIG. 5, adjacently located cylinders 8-11 in second cylinder bank 34 may be donor cylinders. A first non-donor cylinder 7 may be located at first end 35 of second cylinder bank 34. A second non-donor cylinder 12 may be located at second end 37 of second cylinder bank 34. Engine system may include fourth exhaust manifold 112, which may be connected to first exhaust manifold 58 via passageway 114. Fourth exhaust manifold 112 may receive exhaust from second non-donor cylinder 12. Thus, exhaust from cylinders 1-6, 7, and 12 may pass via first, second, and fourth exhaust manifolds 58, 60, and 112, respectively to turbine 52. Like engine system 100, engine system 110 may also provide an EGR rate of about 33%. Although FIG. 5 depicts cylinders 8-11 as donor cylinders, in another exemplary embodiment, cylinders 2-5 may be selected as donor cylinders with non-donor cylinders 1 and 6 located at first end 31 and second end 33, respectively, of first cylinder bank 32. As discussed in the context of engine systems 30, 80, and 100, selecting four adjacent cylinders 2-5 or 8-11 may simplify the design of first, second, third, and fourth exhaust manifolds 58, 60, 62, 112 and allow compact packaging of the components of engine system 110.

Like engine system 100, engine system 110 may also have a non-uniform flow of exhaust from third exhaust manifold 62 to first and second intake manifolds 38, 40. For example, in a 12 cylinder engine in which combustion events in cylinders 1-12 occur sequentially in cylinders 1-7-5-11-3-9-6-12-2-8-4-10, respectively, selecting 2-5 or 8-11 on first or second cylinder bank 32, 34, respectively, as donor cylinders may produce combustion event intervals of 120°, 240°, 120°, and 240° crank angle between donor cylinders. Although the intervals between combustion events in donor cylinders 2, 3, 4, 5 or 8, 9, 10, 11 may be unequal, this arrangement of donor cylinders may still help ensure a minimum amount of pollutants are produced by the donor cylinders at the desired EGR rate. Although FIGS. 4 and 5 depict adjacently located donor cylinders 9-12 and 8-11, respectively, it is contemplated that in some exemplary embodiments, the four donor cylinders may not be located adjacent to each other and any four cylinders from cylinders 1-12 may be selected as donor cylinders.

Figure 6:
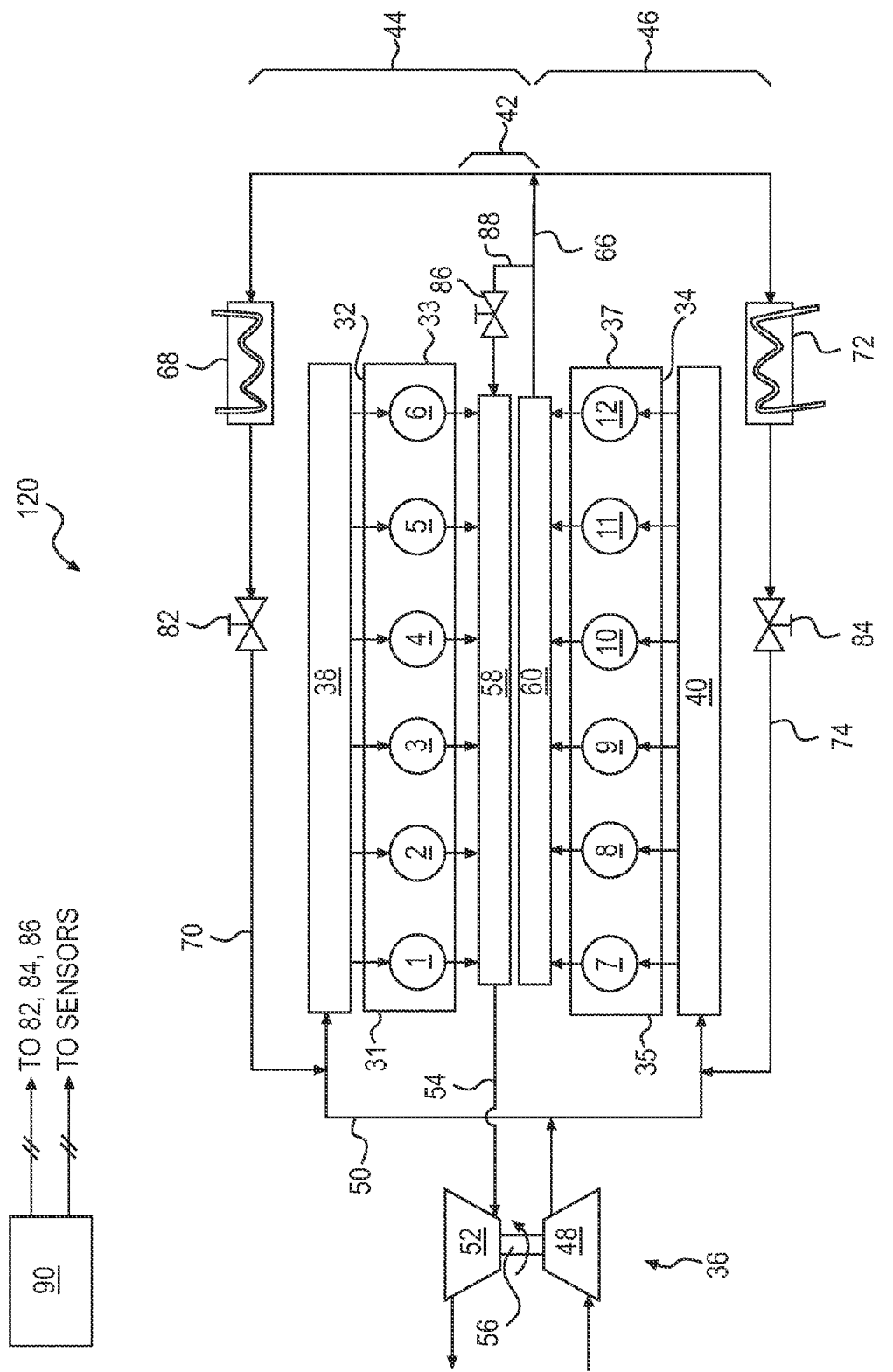
FIG. 6 is a diagrammatic illustration of another exemplary disclosed system that may be used in conjunction with the engine of FIG. 1.

FIG. 6 illustrates an engine system 120, which may be used in conjunction with engine 20. Many of the components of engine system 120 are similar to those already described with reference to engine systems 30, 80, 100, and 110. In the following disclosure, only those components, which may be different from the components of engine systems 30, 80, 100, and 110 are described.

As illustrated in FIG. 6, in engine system 120, all six cylinders 7-12 in second cylinder bank 34 may be donor cylinders and all six cylinders 1-6 in first cylinder bank 32 may be non-donor cylinders. Engine system 120 may include second exhaust manifold 60, which may receive exhaust from cylinders 7-12. Second exhaust manifold 60 may be connected to first exhaust manifold 58 via passageway 88. Third control valve 86 may be located in passageway 88 and may control exhaust flowing from second exhaust manifold 60 to first exhaust manifold 58. Engine system 120 may provide an EGR rate of about 50% at any operating condition of engine 20. Although FIG. 6 depicts cylinders 7-12 as donor cylinders, in another exemplary embodiment, cylinders 1-6 may be selected as donor cylinders and cylinders 7-12 may be selected as non-donor cylinders. As discussed in the context of engine systems 30, 80, 100, and 110, selecting six adjacent cylinders 1-6 or 7-12 as donor cylinders may simplify the design of first and second exhaust manifolds 58, 60 and allow compact packaging of the components of engine system 120.

Like engine system 80, engine system 120 may also have a uniform flow of exhaust from second exhaust manifold 60 to first and second intake manifolds 38, 40. For example, in a 12 cylinder engine in which combustion events in cylinders 1-12 occur sequentially in cylinders 1-7-5-11-3-9-6-12-2-8-4-10, respectively, selecting cylinders 1-6 or 7-12 on first or second cylinder bank 32, 34, respectively, as donor cylinders may produce a combustion event in a donor cylinder between combustion events in two non-donor cylinders. Thus, the interval between combustion events in any two donor cylinders may be uniform and about 120° crank angle.

FIGS. 3-6 depict engine systems 80, 100, 110, 120, respectively, as including first, second, and third control valves 82, 84, 86, and controller 90. It is contemplated however, that in certain exemplary embodiments, engine systems 80, 100, 110 may be implemented without using any of first, second, and third control valves 82, 84, 86, or controller 90. It is also contemplated that engines systems 30, 80, 100, 110 may include one or more additional components such as injectors, pumps, filters, blowers, etc. which may be necessary for the operation of engine systems 30, 80, 100, 110.

INDUSTRIAL APPLICABILITY

The disclosed engine systems may be used in any machine or power system application where it is beneficial to reduce an amount of pollutants discharged into the atmosphere. The disclosed engine systems may find particular applicability with mobile machines such as locomotives, which can be subjected to large variations in load. The disclosed engine systems may provide an improved method for reducing the amount of pollutants in the exhaust discharged to the atmosphere. The disclosed engine systems may also provide a method of reducing the amount of pollutants without implementing additional components such as control valves to control the flow of exhaust in the engine systems. An exemplary operation of engine system 30 will now be described.

During operation of engine system 30, air or a mixture of air and fuel may be pressurized by compressor 48 and directed into cylinders 1-12 for subsequent combustion. Combustion of the air/fuel mixture may result in mechanical power being generated and directed from engine system 30 by way of a rotating crankshaft. By-products of combustion, namely exhaust and heat, may flow from engine system 30 through turbine 52 to the atmosphere.

Exhaust and heat produced in donor cylinders 10-12 of engine system 30 may be recirculated by third exhaust manifold 62 into first and second intake manifolds 38, 40, respectively. First EGR cooler 68 may receive a first amount of exhaust from third exhaust manifold 62 and may cool the first amount of exhaust before it mixes with compressed air from compressor 48 in first intake manifold 38, which may distribute the exhaust-air mixture to non-donor cylinders 1-6. Second EGR cooler 72 may receive a second amount of exhaust from third exhaust manifold 62 and may cool the second amount of exhaust before it mixes with compressed air from compressor 48 in second intake manifold 40, which may distribute the exhaust-air mixture to non-donor cylinders 7-9 and donor cylinders 10-12. The recirculation of exhaust may help dilute the mixture of fuel and air and increase the thermal capacity within cylinders 1-12, resulting in a lower combustion temperature. The lower combustion temperature in cylinders 1-12 may help reduce an amount of pollutants produced during combustion. Thus, engine system 30 may provide an EGR rate of about 25% at all operating conditions of engine 20 without using any flow control elements to control the EGR rate.

Engine system 80 may operate in a similar manner to that of engine system 30. During an exemplary operation of engine system 80, controller 90 may regulate first control valve 82 to help deliver a first amount of exhaust from third exhaust manifold 62 to first intake manifold 38. Similarly, controller 90 may regulate second control valve 84 to help deliver a second amount of exhaust from third exhaust manifold 62 to second intake manifold 40. Controller 90 may also regulate third control valve 86 to control a third amount of exhaust flowing from third exhaust manifold 62 to second exhaust manifold 60.

For example, controller 90 may open first and second control valves 82, 84 and close third control valve 86 to divert the first and second amounts of exhaust from third exhaust manifold 62 to first and second intake manifolds 38, 40, respectively. Moreover, by closing third control valve 86, controller 90 may help ensure that all the exhaust generated by donor cylinders 10-12 may be recirculated in first and second EGR circuits 44, 46. In contrast, when engine 20 operates at high altitudes or at relatively low ambient temperatures, it may be desirable to allow only fresh intake air to enter cylinders 1-12. Moreover, because of the low temperature of intake air from the cold external ambient, there may be no need to use EGR to reduce the combustion temperature in cylinders 1-12 to control the amount of pollutants produced by cylinders 1-12. In such operating conditions, controller 90 may close first and second control valves 82, 84 and open third control valve 86 to allow all of the exhaust from donor cylinders 10-12 to pass from third exhaust manifold 62 to second exhaust manifold 60 and to turbine 52. In other words, by closing first and second control valves 82, 84, and opening first control valve 86, controller 90 may allow a third amount of exhaust, which is about equal to a sum of the first and second amounts of exhaust, to flow from third exhaust manifold 62 to second exhaust manifold 60. Moreover, by closing first and second control valves 82, 84, controller 90 may ensure that no exhaust from third exhaust manifold 62 is recirculated via first and second EGR circuits 44, 46 to first and second intake manifolds 38, 40, respectively.

Engine system 120 may operate in a similar manner to that of engine system 80. During an exemplary operation of engine system 120, controller 90 may regulate first control valve 82 to help deliver a first amount of exhaust from second exhaust manifold 60 to first intake manifold 38. Similarly, controller 90 may regulate second control valve 84 to help deliver a second amount of exhaust from second exhaust manifold 60 to second intake manifold 40. Controller 90 may also regulate third control valve 86 to control a third amount of exhaust flowing from second exhaust manifold 60 to first exhaust manifold 58.

For example, controller 90 may open first and second control valves 82, 84 and close third control valve 86 to divert the first and second amounts of exhaust from second exhaust manifold 60 to first and second intake manifolds 38, 40, respectively. Moreover, by closing third control valve 86, controller 90 may help ensure that all the exhaust generated by donor cylinders 7-12 may be recirculated in first and second EGR circuits 44, 46. In contrast, when engine 20 operates at high altitudes or at relatively low ambient temperatures, it may be desirable to allow only fresh intake air to enter cylinders 1-12. Moreover, because of the low temperature of intake air from the cold external ambient, there may be no need to use EGR to reduce the combustion temperature in cylinders 1-12 to control the amount of pollutants produced by cylinders 1-12. In such operating conditions, controller 90 may close first and second control valves 82, 84 and open third control valve 86 to allow all of the exhaust from donor cylinders 7-12 to pass from second exhaust manifold 60 to first exhaust manifold 58 and to turbine 52. In other words, by closing first and second control valves 82, 84, and opening third control valve 86, controller 90 may allow a third amount of exhaust, which is about equal to a sum of the first and second amounts of exhaust, to flow from second exhaust manifold 60 to first exhaust manifold 58. Moreover, by closing first and second control valves 82, 84, controller 90 may ensure that no exhaust from second exhaust manifold 60 is recirculated via first and second EGR circuits 44, 46 to first and second intake manifolds 38, 40, respectively.

Engine systems 80, 100, 110, and 120 when implemented without first, second, and third control valves 82, 84, 86, respectively, may operate in a manner similar to the method of operation of engine system 30 described above. Similarly engine systems 100 and 110 when implemented with first, second, and third control valves 82, 84, 86, respectively, may operate in a manner similar to the method of operation of engine systems 80 and 120 described above.

It will be apparent to those skilled in the art that various modifications and variations can be made to the disclosed engine system without departing from the scope of the disclosure. Other embodiments of the engine system will be apparent to those skilled in the art from consideration of the specification and practice of the engine system disclosed herein. It is intended that the specification and examples be considered as exemplary only, with a true scope of the disclosure being indicated by the following claims and their equivalents.

What is claimed is:

1. An engine system, comprising:
   a first intake manifold configured to distribute air into a first cylinder bank of an engine;
   a second intake manifold configured to distribute air into a second cylinder bank of the engine;
   a first exhaust manifold configured to discharge exhaust from the first cylinder bank to the atmosphere;
   a second exhaust manifold configured to discharge exhaust from non-donor cylinders in the second cylinder bank to the atmosphere;
   a third exhaust manifold separate from the first and second exhaust manifolds and configured to recirculate exhaust from donor cylinders in the second cylinder bank to the first and second intake manifolds;
   a first control valve configured to selectively direct a first amount of exhaust from the third exhaust manifold to the first intake manifold; and
   a second control valve configured to selectively direct a second amount of the exhaust from the third exhaust manifold to the second intake manifold.

2. The engine system of claim 1, further including:
   a first cooler configured to cool exhaust flowing from the third exhaust manifold to the first intake manifold; and
   a second cooler configured to cool exhaust flowing from the third exhaust manifold to the second intake manifold.

3. The engine system of claim 2, wherein
   the first control valve is disposed downstream of the first cooler, and
   the second control valve is disposed downstream of the second cooler.

4. The engine system of claim 3, wherein the first amount of exhaust is about equal to the second amount of exhaust.

5. The engine system of claim 4, wherein the donor cylinders are located adjacent to each other.

6. The engine system of claim 5, wherein at least one of the donor cylinders is located adjacent a first end of the second cylinder bank.

7. The engine system of claim 6, further including:
   a passageway fluidly connecting the second exhaust manifold and the third exhaust manifold; and
   a third control valve disposed in the passageway and configured to selectively direct a third amount of exhaust from the third exhaust manifold to the second exhaust manifold.

8. The engine system of claim 7, wherein the first cylinder bank and the second cylinder bank are disposed at an angle with respect to each other.

9. The engine system of claim 8, wherein the third amount of exhaust is about equal to a sum of the first amount of exhaust and the second amount of exhaust.

10. The engine system of claim 4, wherein an EGR rate is about equal to 33%.

11. The engine system of claim 4, wherein:
    the donor cylinders are located adjacent to each other in the second cylinder bank;
    a first non-donor cylinder is located adjacent a first end of the second cylinder bank; and
    a second non-donor cylinder is located adjacent a second end of the second cylinder bank.

12. The engine system of claim 11, wherein:
    the first cylinder bank includes 6 cylinders;
    the second cylinder bank includes 6 cylinders; and
    a number of the donor cylinders is 4.

13. A method of operating an engine, comprising:
    distributing air through a first intake manifold into a first cylinder bank of the engine;
    distributing air through a second intake manifold into a second cylinder bank of the engine;
    discharging exhaust from the first cylinder bank through a first exhaust manifold to the atmosphere;
    discharging exhaust from non-donor cylinders in the second cylinder bank through a second exhaust manifold to the atmosphere;
    discharging exhaust from donor cylinders in the second cylinder bank to a third exhaust manifold, the third exhaust manifold being separate from the first and second exhaust manifolds;
    selectively adjusting a first control valve to direct a first amount of the exhaust from the third exhaust manifold to the first intake manifold; and
    selectively adjusting a second control valve to direct a second amount of the exhaust from the third exhaust manifold to the second intake manifold.

14. The method of claim 13, further including:
    cooling the first amount of exhaust from the third exhaust manifold; and
    cooling the second amount of the exhaust from the third exhaust manifold.

15. The method of claim 14, further including adjusting the first and second control valves such that the first amount is about equal to the second amount.

16. The method of claim 15, further including:
    closing the first and second control valves; and
    directing the first and second amounts of the exhaust from the third exhaust manifold to the second exhaust manifold.

17. An engine, comprising:
a first cylinder bank;
a second cylinder bank including:
donor cylinders located adjacent to each other;
a first non-donor cylinder located adjacent the first end of the second cylinder bank; and
a second non-donor cylinder located adjacent the second end of the second cylinder bank;
a first intake manifold connected between the atmosphere and the first cylinder bank;
a second intake manifold connected between the atmosphere and the second cylinder bank;
a first exhaust manifold connected between the first cylinder bank and the atmosphere;
a second exhaust manifold connected between the first non-donor cylinder and the first intake manifold;
a third exhaust manifold connected between the donor cylinders and the first and second intake manifolds; and
a fourth exhaust manifold connected between the second non-donor cylinder and the first exhaust manifold.

18. The engine of claim 17, further including:
a first control valve disposed between the third exhaust manifold and the first intake manifold;
a second control valve disposed between the third exhaust manifold and the second intake manifold;
a passageway connecting the second exhaust manifold and the third exhaust manifold;
a third control valve disposed in the passageway; and
a controller configured to selectively adjust the first, second, and third control valves.

19. An engine, comprising:
a first cylinder bank including six non-donor cylinders;
a second cylinder bank including six donor cylinders;
a first intake manifold connected between the atmosphere and the first cylinder bank;
a second intake manifold connected between the atmosphere and the second cylinder bank;
a first exhaust manifold connected between the first cylinder bank and the atmosphere;
a second exhaust manifold connected between the donor cylinders and the first and second intake manifolds;
a first control valve disposed between the second exhaust manifold and the first intake manifold; and
a second control valve disposed between the second exhaust manifold and the second intake manifold.

20. The engine of claim 19, further including:
a passageway connecting the second exhaust manifold and the first exhaust manifold; and
a third control valve disposed in the passageway.

* * * * *